United States Patent
Kaidu et al.

(10) Patent No.: US 11,114,961 B2
(45) Date of Patent: Sep. 7, 2021

(54) MOTOR DRIVING CONTROL DEVICE AND MOTOR DRIVING CONTROL METHOD

(71) Applicant: MINEBEA MITSUMI Inc., Nagano (JP)

(72) Inventors: Hiroyuki Kaidu, Kakegawa (JP); Wataru Nogamida, Kakegawa (JP); Masato Aoki, Iwata (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 16/783,271

(22) Filed: Feb. 6, 2020

(65) Prior Publication Data

US 2020/0266732 A1   Aug. 20, 2020

(30) Foreign Application Priority Data

Feb. 14, 2019   (JP) .............................. JP2019-024404

(51) Int. Cl.
| | |
|---|---|
| *F04D 27/00* | (2006.01) |
| *H02P 6/15* | (2016.01) |
| *H02P 23/28* | (2016.01) |
| *H02P 6/28* | (2016.01) |
| *H02P 6/18* | (2016.01) |
| *H02P 6/20* | (2016.01) |
| *H02P 27/06* | (2006.01) |

(52) U.S. Cl.
CPC ................. *H02P 6/15* (2016.02); *H02P 6/18* (2013.01); *H02P 6/20* (2013.01); *H02P 6/28* (2016.02); *H02P 23/28* (2016.02); *H02P 27/06* (2013.01)

(58) Field of Classification Search
CPC .... H02P 6/182; H02P 6/15; H02P 6/28; H02P 23/28; H02P 6/18; F04D 27/008
See application file for complete search history.

(56) References Cited

U.S. PATENT DOCUMENTS

| | | | |
|---|---|---|---|
| 2013/0043817 A1* | 2/2013 | Shibuya | H02P 6/182 318/400.33 |
| 2014/0369813 A1* | 12/2014 | Muramatsu | F04D 27/008 415/118 |
| 2018/0234042 A1 | 8/2018 | Aoki | |

FOREIGN PATENT DOCUMENTS

JP       2018-133895 A      8/2018

* cited by examiner

*Primary Examiner* — Cortez M Cook
(74) *Attorney, Agent, or Firm* — Pearne & Gordon LLP (57) ABSTRACT

A motor driving control device includes a motor driving unit, a position detection unit, a current detection unit and a control unit. The control unit includes a change detecting means configured to detect a predetermined phase change in the position signal, a first switching means configured to sequentially switch energization patterns of the coils with the plurality of phases based on a timing when the phase change is detected, and a second switching means configured to, in a state where the change detecting means does not detect the phase change, when a value of the drive current becomes a predetermined first threshold or more during a monitoring time period after a timing when the predetermined phase change in the position signal is expected, perform an operation to forcibly switch to a next energization pattern regardless of the timing of switching the energization pattern by the first switching means.

7 Claims, 7 Drawing Sheets

MOTOR DRIVING CONTROL DEVICE AND MOTOR DRIVING CONTROL METHOD

CROSS-REFERENCE TO RELATED APPLICATIONS

This application claims the benefit of Japanese Patent Application No. 2019-024404, filed Feb. 14, 2019, which is hereby incorporated by reference in its entirety.

BACKGROUND

Technical Field

The present disclosure relates to a motor driving control device and a motor driving control method, and particularly relates to a motor driving control device and method capable of performing a so-called one-sensor drive.

Background Art

Examples of a motor driving control device that controls drive of a motor include a device driving a motor by a so-called one-sensor drive. For example, there is a device driving a motor using only one Hall sensor for detecting a magnetic pole position of the motors.

In a case of driving a motor using a one-sensor drive, a magnetic pole position cannot be identified differently from a case of using a plurality of sensors. For this reason, the motor is driven by switching an energization pattern sequentially at a timing identified based on a period of a signal output from the Hall sensor (see Japanese Patent Application Laid-Open No. 2018-133895, for example).

Here, in the case of driving a motor using one sensor as described above, if information from the sensor cannot be acquired for some reasons during the driving, the energization pattern cannot be switched and a current flowing in the motor significantly increases disadvantageously. If the current flowing in the motor excessively increases, a failure possibly occurs in the motor driving control device and components of the motor.

The present disclosure is related to providing a motor driving control device and a motor driving control method in which a current flowing in the motor does not excessively increase even when a signal for position detection cannot be acquired.

SUMMARY

In accordance with one aspect of the present disclosure, a motor driving control device includes a motor driving unit having a plurality of switching elements connected to a power supply and configured to selectively energize coils with a plurality of phases of a motor, a position detection unit corresponding to any one of the plurality of phases and configured to output a position signal, a phase of the position signal changing depending on a position of a rotor of the motor, a current detection unit configured to detect a drive current of the motor, and a control unit configured to output a drive control signal for operating the plurality of switching elements to the motor driving unit, wherein the control unit includes a change detecting means configured to detect a predetermined phase change in the position signal, a first switching means configured to sequentially switch energization patterns of the coils with the plurality of phases based on a timing when the phase change is detected, and a second switching means configured to, in a state where the change detecting means does not detect the phase change, when a value of the drive current becomes a predetermined first threshold or more during a monitoring time period after a timing when the predetermined phase change in the position signal is expected, perform an operation to forcibly switch to a next energization pattern regardless of the timing of switching the energization pattern by the first switching means.

Preferably, the control unit further includes a stopping means configured to stop driving of the motor in a case that the state where the change detecting means does not detect the phase change continues until a timing when the monitoring time period ends.

Preferably, the motor includes three-phase coils, and a time from the timing when the predetermined phase change in the position signal is expected to the timing when the monitoring time period ends is longer than a time presumed to be taken for the rotor to rotate by 30 degrees in an electrical angle.

Preferably, a timing when the monitoring time period starts is a timing when a predetermined time elapses from the timing when the predetermined phase change in the position signal is expected.

Preferably, the control unit further includes an overcurrent restricting means configured to stop the energization by the motor driving unit when the value of the drive current exceeds a predetermined second threshold driving unit.

Preferably, the second switching means does not perform the operation to forcibly switch to the next energization pattern during a time period other than the monitoring time period.

In accordance with another aspect of the present disclosure, a motor driving control method is a method for driving a motor by use of a motor driving unit having a plurality of switching elements connected to a power supply and configured to selectively energize coils with a plurality of phases of the motor, a position detection unit corresponding to any one of the plurality of phases and configured to output a position signal, a phase of the position signal changing depending on a position of a rotor of the motor, and a current detection unit configured to detect a drive current of the motor, the method including a change detecting step of detecting a predetermined phase change in the position signal, a first switching step of sequentially switching energization patterns of the coils with the plurality of phases based on a timing when the phase change is detected, and a second switching step of, in a state where the change detecting step does not detect the phase change, when a value of the drive current becomes a predetermined first threshold or more during a monitoring time period after a timing when the predetermined phase change in the position signal is expected, forcibly performing an operation to switch to a next energization pattern regardless of the timing of switching the energization pattern by the first switching step.

According to these disclosures, it is possible to provide a motor driving control device and a motor driving control method in which a current flowing in the motor does not excessively increase even when a signal for position detection cannot be acquired.

DETAILED DESCRIPTION

Hereinafter, a motor driving control device in one of embodiments according to the present disclosure will be described.

Embodiments

Figure 1:
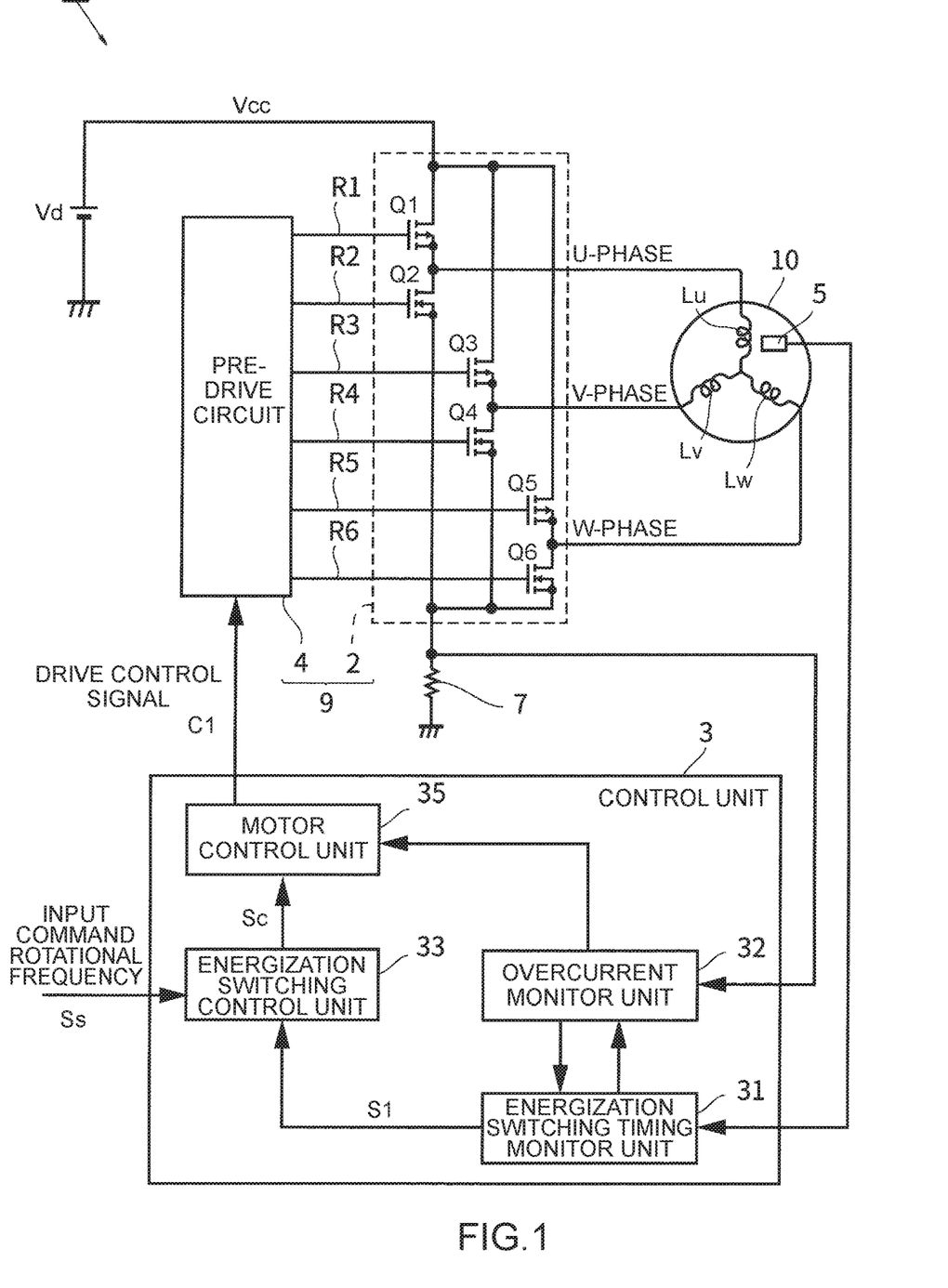
FIG. 1 is a view illustrating a configuration of a motor driving control device according to one of embodiments of the present disclosure.

FIG. 1 is a view illustrating a configuration of a motor driving control device 1 according to one of the embodiments of the present disclosure.

As illustrated in FIG. 1, the motor driving control device 1 includes a control unit 3, a position detector (an example of a position detection unit) 5, a current detection unit 7 and a motor driving unit 9. The motor driving control device 1 supplies driving power to the motor 10 to drive the motor 10. Note that the motor 10 according to the present embodiment is a three-phase brushless motor having coils Lu, Lv and Lw of a U-phase, a V-phase and a W-phase, respectively.

The position detector 5 corresponds to any one of the plurality of phases of the motor 10 and outputs the position signals. The phases of the position signals change depending on a position of a rotor of the motor 10. Specifically, the position detector 5 is a magnetic sensor such as a Hall element or a Hall IC, for example, and a Hall signal as a position signal is output. The position signal output from the position detector 5 is input to the control unit 3. The position detector 5 detects the position of the rotor at one location of the motor 10 and outputs the position signal. For example, one position detector 5 is provided to correspond to the coil Lu of U-phase. The position signal turns to high from low (rise; rising edge) when the rotor passes a predetermined position (when the rotor comes at a first rotational position) while the rotor rotates once, and returns to low from high (fall; falling edge) when the rotor passes another predetermined position (when the rotor comes at a second rotational position). The position signal is a signal which periodically turns to high and low in accordance with rotations of the rotor.

The first and second rotational positions are positions corresponding to any one of the phases of the motor 10. The position signal is a signal whose phase changes in accordance with the position of the rotor, i.e., in accordance with a positional relationship between any one of the phases of the motor 10 and the rotor. Note that a signal periodically repeating turning to high and low may be directly output as a position signal from the position detector 5, or an analog position signal output from the position detector 5 may be input to the control unit 3 and then converted into a signal which periodically turns to high and low (the signal converted from an analog position signal is also referred to as the position signal in the following description).

In the present embodiment, only one position detector 5 is provided. That is, a position signal detected at only one location of the motor 10 is input to the control unit 3. Note that a plurality of position detectors 5 respectively corresponding to the plurality of phases may be provided, but the position signal output from only one of those position detectors 5 is input to the control unit 3 to be used. Specifically, in the present embodiment, the position signal output from one position detector 5 is input to the control unit 3. The motor driving control device 1 drives the motor 10 with a one-sensor scheme in which only one position detector 5 for detecting the position of the rotor is used.

The motor driving unit 9 selectively energizes the coils Lu, Lv and Lw with a plurality of phases of the motor 10. The motor driving unit 9 includes an inverter circuit 2 and a pre-drive circuit 4. A drive control signal C1 output from the control unit 3 is input to the motor driving unit 9.

The inverter circuit 2 selectively energizes the three-phase coils Lu, Lv and Lw of the motor 10 based on six kinds of drive signals R1 to R6 output from the pre-drive circuit 4 to control rotations of the motor 10.

In the present embodiment, the inverter circuit 2 includes six switching elements Q1 to Q6 for supplying a drive current to each of the coils Lu, Lv and Lw of the motor 10. The switching elements Q1, Q3 and Q5 are high-side switching elements formed with MOFSETs (Metal-Oxide-Semiconductor Field Effect Transistors) of P-channel placed on a positive electrode side of a direct current power supply Vcc. The switching elements Q2, Q4 and Q4 are low-side switching elements formed with MOSFETs of N-channel placed on a negative electrode side of the direct current power supply Vcc. In each of a combination of the switching elements Q1 and Q2, a combination of the switching elements Q3 and Q4, and a combination of the switching elements Q5 and Q6, two switching elements are connected in series. Those three sets of series circuits are connected in parallel to form a bridge circuit. A connection point between the switching elements Q1 and Q2 is connected to the coil Lu of U-phase, a connection point between the switching elements Q3 and Q4 is connected to the coil Lv of V-phase, and a connection point between the switching elements Q5 and Q6 is connected to the coil Lw of W-phase.

The pre-drive circuit 4 includes a plurality of output terminals connected to respective gate terminals of six switching elements Q1 to Q6 of the inverter circuit 2. The drive signals R1 to R6 are output from the respective output terminals to control on/off operations of the switching elements Q1 to Q6. The drive control signal C1 output from the control unit 3 is input to the pre-drive circuit 4. The pre-drive circuit 4 outputs the drive signals R1 to R6 based on the drive control signal C1 to operate the inverter circuit 2. That is, the inverter circuit 2 selectively energizes the coil Lu, Lv and Lw of respective phases of the motor 10 based on the drive control signal C1.

The current detection unit 7 detects a drive current of the motor 10. In the present embodiment, the current detection unit 7 includes a current detecting resistor arranged between the inverter circuit 2 and a ground potential (negative electrode of the power supply Vcc) and detects a voltage value corresponding to the drive current of the motor 10. Specifically, the drive current flowing in the phases of the coils Lu, Lv and Lw of the motor 10 passes through the inverter circuit 2 and the current detecting resistor, and then flows to the ground potential. The current detection unit 7 can detect a magnitude of the drive current of the motor 10 as a voltage value from voltages on both ends of the current detecting resistor. A signal having the detected voltage value corresponding to the magnitude of the drive current is input to the control unit 3. Note that the current detection unit 7 may be configured to detect a power supply current of the motor 10.

The control unit 3 outputs the drive control signal C1 for operating the plurality of switching elements Q1 to Q6 to the motor driving unit 9 to control an operation of the motor driving unit 9. The control unit 3 switches, in a predetermined order, energization patterns (energization phases) of the coils Lu, Lv and Lw with a plurality of phases by outputting the drive control signal C1 to the motor driving unit 9. The control unit 3 can be formed by using a programmable device such as DSP (Digital Signal Processor), FPGA (Field Programmable Gate Array), a microcomputer or the like. However, the control unit 3 is not limited to such devices.

While details are to be described later, the control unit 3, as a change detecting means, detects a predetermined phase change in the position signal. The control unit 3, as a first switching means, sequentially switches the energization patterns of the coils Lu, Lv and Lw with a plurality of phases based on a timing when the predetermined phase change in the position signal is detected. The control unit 3, as a second switching means, in a state of not detecting the predetermined phase change in the position signal, when a value of the drive current becomes a first threshold or more during a monitoring time period after a timing when the predetermined phase change in the position signal is expected, performs an operation to forcibly switch to the next energization pattern regardless of the timing of switching the energization pattern which the control unit 3 as the first switching means is to perform. In other words, the control unit 3 uses the motor driving unit 9, the position detector 5 and the current detection unit 7 to perform a motor driving control method for driving the motor 10. Specifically, the control unit 3 detects a predetermined phase change in the position signal (a change detecting step), and sequentially switches the energization patterns of the coils Lu, Lv and Lw with a plurality of phases based on the detected timing (a first switching step). Moreover, the control unit 3, in the state of not detecting the predetermined phase change in the position signal, when a value of the drive current becomes a first threshold or more during a monitoring time period after a timing when the predetermined phase change in the position signal is expected, performs an operation to forcibly switch to the next energization pattern regardless of the timing of switching the energization pattern which the control unit 3 as the first switching means is to perform (a second switching step).

The control unit (an example of a stopping means) 3 includes an energization switching timing monitor unit (an example of the change detecting means, an example of the first switching means and an example of the second switching means) 31, an overcurrent monitor unit (an example of an overcurrent restricting means) 32, an energization switching control unit 33 and a motor control unit 35. The position signal output from the position detector 5, an input command rotational frequency Ss, and a signal having a voltage value corresponding to a magnitude of the drive current that is a detection result of the current detection unit 7 are input to the control unit 3.

The input command rotational frequency Ss is a signal concerning a rotational speed of the motor 10. For example, the input command rotational frequency Ss is a PWM (pulse-width modulation) signal corresponding to a target rotational speed of the motor 10. In other words, the input command rotational frequency Ss is information corresponding to a target value of the rotational speed of the motor 10. Note that a clock signal may be input as the input command rotational frequency Ss.

Figure 2:
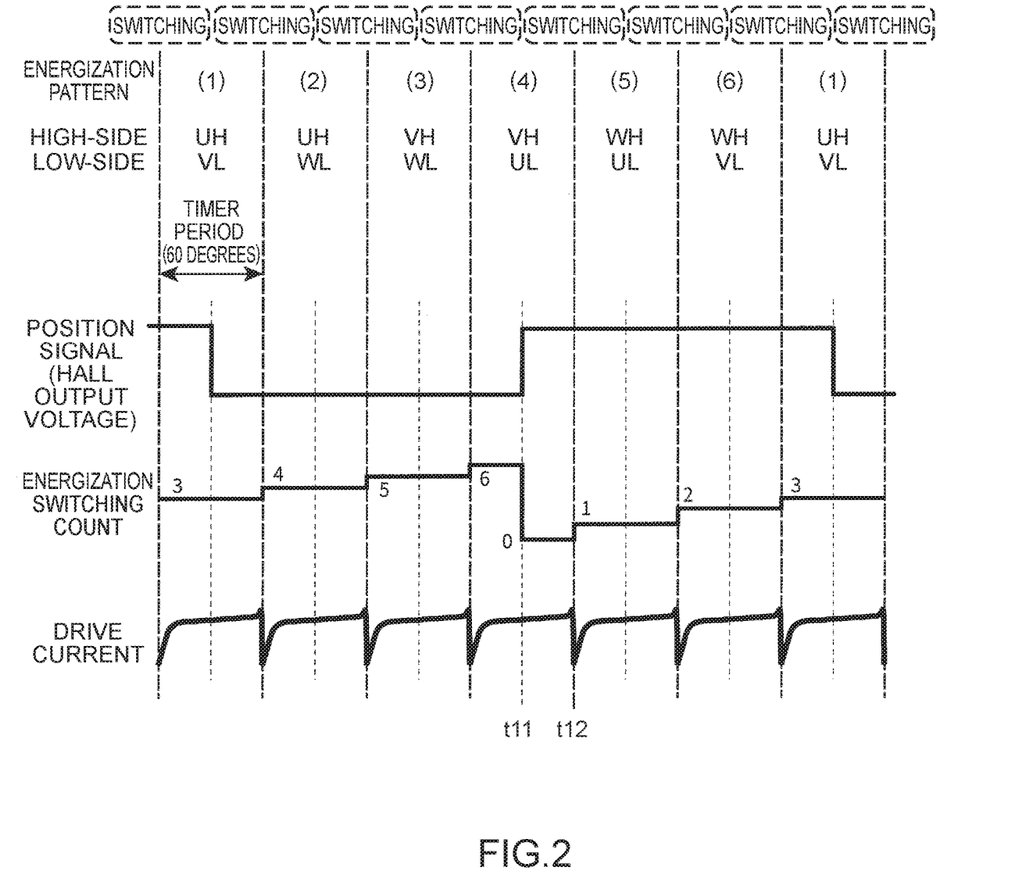
FIG. 2 is a view illustrating a relationship between energization patterns and a position signal in normal times.

FIG. 2 is a view illustrating a relationship between the energization patterns and the position signal in normal times.

FIG. 2 schematically illustrates, from the upper, an energization pattern, a waveform of a position signal, a transition of a value of an energization switching counter described later and a transition of a drive current of the motor 10.

Since the motor 10 includes the three-phase coils Lu, Lv and Lw, the motor 10 has six energization patterns. That is, as illustrated in FIG. 2, the motor 10 has (1) a first energization pattern that is a combination of a high-side U-phase and a low-side V-phase, (2) a second energization pattern that is a combination of the high-side U-phase and a low-side W-phase, (3) a third energization pattern that is a combination of a high-side V-phase and the low-side W-phase, (4) a fourth energization pattern that is a combination of the high-side V-phase and a low-side U-phase, (5) a fifth energization pattern that is a combination of a high-side W-phase and the low-side U-phase, and (6) a sixth energization pattern that is a combination of the high-side W-phase and the low-side V-phase.

When the motor 10 is rotated in a predetermined direction, the control unit 3 repeats one cycle of switching control in which all six energization patterns are each switched in a predetermined order. The predetermined order is, for example, an order of a first energization pattern, a second energization pattern, a third energization pattern, a fourth energization pattern, a fifth energization pattern and a sixth energization pattern.

Returning to FIG. 1, the position signal output from the position detector 5 is input to the energization switching timing monitor unit 31. The energization switching timing monitor unit 31 outputs actual rotational frequency information S1 including energization switching timing information and information representing an actual rotational frequency corresponding to a real rotational frequency of the motor 10, based on the position signal. The energization switching timing monitor unit 31 detects a rise timing of the position signal (an example of a predetermined phase change), and outputs the actual rotational frequency information S1 including the energization switching timing information indicating a timing for switching the energization pattern based on information of the rise timing. Note that the energization switching timing monitor unit 31 may detect a fall timing of the position signal as a predetermined phase change, or may detect both the rise and fall. In short, the energization switching timing monitor unit 31 may be configured to detect a change periodically coming in a phase of a predetermined aspect.

The input command rotational frequency Ss and the actual rotational frequency information S1 are input to the energization switching control unit 33. The energization switching control unit 33 generates and outputs a drive command signal Sc based on the input command rotational frequency Ss and the actual rotational frequency information S1. The energization switching control unit 33 performs feedback control to output the drive command signal Sc such that the motor 10 rotates at the input command rotational frequency Ss based on the actual rotational frequency information S1. At this time, the energization switching control unit 33 outputs the drive command signal Sc such that the energization patterns of the coils Lu, Lv and Lw with a plurality of phases sequentially switch based on the actual rotational frequency information S1.

The motor control unit 35 outputs the drive control signal C1 based on the drive command signal Sc. Specifically, the motor control unit 35 generates the drive control signal C1 based on the drive command signal Sc, and outputs the generated drive control signal C1 to the pre-drive circuit 4 in the motor driving unit 9.

The signal of the voltage value corresponding to the magnitude of the drive current acquired in the current detection unit 7 is input to the overcurrent monitor unit 32. The overcurrent monitor unit 32 monitors the drive current flowing in the motor 10 to determine whether or not the drive current is larger than a predetermined normal overcurrent threshold (an example of a second threshold). Then, when the overcurrent monitor unit 32 determines that the drive current is larger than the predetermined normal overcurrent threshold, the overcurrent monitor unit 32 controls the motor control unit 35 and serves as the overcurrent restricting means performing overcurrent restriction such that the drive current does not flow in the motor 10. This can prevent the motor 10 or the motor driving control device 1 from failing due to an excessive current flowing in the motor 10 and the motor driving control device 1.

When the motor 10 is driven in normal times, the control unit 3 operates as described below. Specifically, as illustrated in FIG. 2, the control unit 3 switches the energization pattern such that a rise timing t11 of the position signal comes during the fourth energization pattern. When the energization switching timing monitor unit 31 detects a rise of a position signal at the time t11, the energization switching timing monitor unit 31 outputs the energization switching timing information indicating a timing for switching the energization pattern at a time t12 when a predetermined time (e.g., a time taken for rotating by 30 degrees in an electrical angle) has elapsed from the time t11. The energization switching control unit 33 switches, in accordance with the energization switching timing information, to the fifth energization pattern that is the next energization pattern. After that, the energization switching control unit 33 sequentially switches the energization pattern in response to the energization switching timing monitor unit 31 outputting the energization switching timing information. At this time, every time a rise timing of a position signal is detected, the energization switching timing monitor unit 31 measures a time period from when the previous rise timing of the position signal was detected to when the current rise timing of the position signal is detected (a latest period). Then, every time a time (timer period) of one-sixth of the measured latest period (equivalent to an electrical angle of 60 degrees) elapses from a rise timing of a position signal, the energization switching timing monitor unit 31 outputs the energization switching timing information. Such an operation is performed using a timer built in the control unit 3. After switching to the fourth energization pattern, when a cycle of the energization patterns is completed once, switching to the next cycle is performed based on a detection timing of the next rise timing of a position signal. Note that the latest period is not limited to the measurement result of one past period, and may be obtained by averaging measurement results of a plurality of periods.

Here, in the present embodiment, the overcurrent monitor unit 32 determines whether or not the drive current is larger than a predetermined special overcurrent threshold (an example of the first threshold) during a monitoring time period after the next rise timing presumed (hereinafter, also referred to as a presumed timing) based on a rise timing of a position signal detected by the energization switching timing monitor unit 31. The special overcurrent threshold is set to a proper value independently of the normal overcurrent threshold.

The presumed timing can be defined as a timing descried below, for example. Specifically, the energization switching timing monitor unit 31 can measure the latest period every time a rise timing of a position signal is detected. In a case where the speed of the motor 10 does not vary, a rise of a position signal is presumed to come at a timing when the latest period elapses from the current rise timing of the position signal. For this reason, a timing when the latest period elapses from the current rise timing of the position signal can be the presumed timing.

A timing when the monitoring time period starts is a timing when a predetermined time elapses from the presumed timing. A time from the presumed timing to a timing when the monitoring time period ends is longer than a time presumed to be taken for the rotor to rotate by 30 degrees in an electrical angle. In the present embodiment, the monitoring time period starts from a timing when one-twelfth of the latest period (equivalent to an electrical angle of 30 degrees) elapses from the presumed timing. In other words, the timing when the monitoring time period starts is a timing when one-sixth of the latest period (equivalent to an electrical angle of 60 degrees) elapses from a timing when the last switching of switching cycles in one cycle of the energization patterns is performed (the timing of switching from the third energization pattern to the fourth energization pattern).

A length of the monitoring time period is set to a length corresponding to, for example, one energization time period of the energization pattern. For example, a time period until a timing when one-sixth of the latest period (equivalent to an electrical angle of 60 degrees) elapses is set as the length of the monitoring time period.

As described later, once a rise timing of a position signal is detected, and after that, as long as a state of not detecting a rise of a position signal continues, the energization switching timing monitor unit 31 outputs a signal to the overcurrent monitor unit 32 at the timings when the monitoring time period starts and ends. Based on the signal output from the energization switching timing monitor unit 31, the overcurrent monitor unit 32 determines whether or not the drive current is larger than the normal overcurrent threshold during a time period other than the monitoring time period, and determines whether or not the drive current is larger than the special overcurrent threshold during the monitoring time period. If the drive current is determined to be larger than the normal overcurrent threshold, the overcurrent restriction is performed as described above, and if the drive current is determined to be larger than the special overcurrent threshold during the monitoring time period, the signal is output from the overcurrent monitor unit 32 to the energization switching timing monitor unit 31.

When the drive current is determined to be larger than the special overcurrent threshold during a monitoring time period, and the signal is output from the overcurrent monitor unit 32 to the energization switching timing monitor unit 31, the energization switching timing monitor unit 31 outputs the energization switching timing information for forcibly switching the energization pattern. This allows the energization pattern to be forcibly switched to the next energization pattern.

Figure 3:
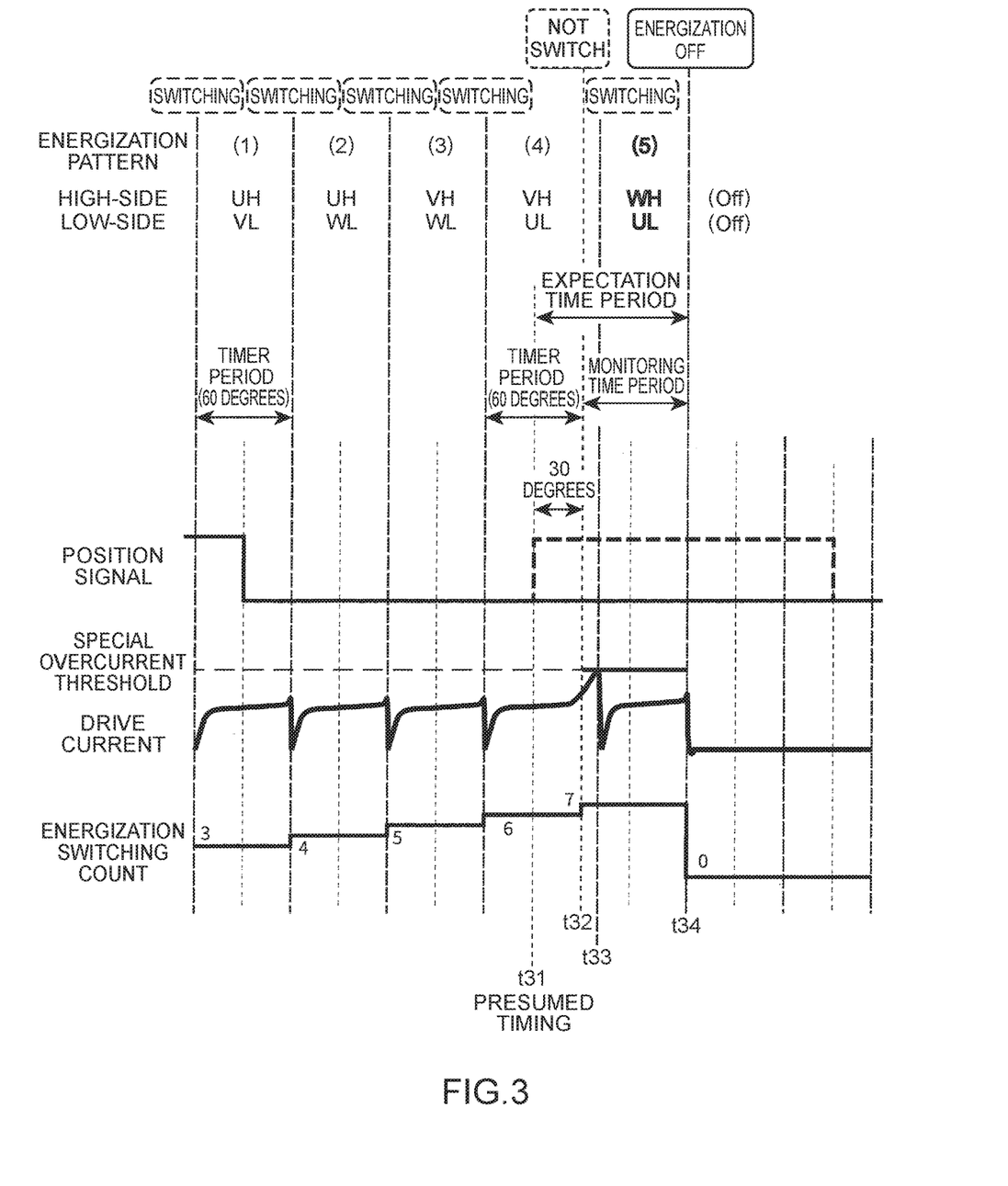
FIG. 3 is a view illustrating a relationship between energization patterns and a position signal when the energization patterns are forcibly switched.

FIG. 3 is a view illustrating a relationship between the energization patterns and the position signal when the energization patterns are forcibly switched.

FIG. 3 schematically illustrates, from the upper, an energization pattern, a waveform of a position signal, a special overcurrent threshold, a transition of a drive current of the motor 10 and a transition of a value of the energization switching counter. As illustrated in FIG. 3, assuming a case that in a state where a presumed timing is presumed to come at a time t31, even when a time is past the presumed timing, a state still continues that the next rise of a position signal is not detected. At this time, at a time t32 when a time equivalent to an electrical angle of 30 degrees elapses from the time t31, the energization pattern is not switched. The monitoring time period starts at the time t32 and ends at a time t34 when a time equivalent to an electrical angle of 60 degrees elapses from the time t32. Note that in the present embodiment, the time period from the presumed timing (time t31) to the time t34 when the monitoring time period ends is an expectation time period for waiting until the next rise of a position signal is made, and even if the next rise of a position signal is not detected, the drive of the motor 10 is not stopped until the time t34 when the monitoring time period ends.

When the monitoring time period starts at the time t32, monitoring whether or not a magnitude of the drive current of the motor 10 exceeds the special overcurrent threshold is started. If the motor 10 is rotating and the energization pattern is not switched at the time t32, the current continues to flow in the motor 10 in the state of the fourth energization pattern. By doing so, the drive current of the motor 10 continues to increase.

When the magnitude of the drive current of the motor 10 reaches the special overcurrent threshold at a time t33, the energization switching timing monitor unit 31 outputs the energization switching timing information, and thereby, the energization pattern is forcibly switched. The energization pattern is changed from the fourth energization pattern to the fifth energization pattern. By switching the energization pattern, the magnitude of the drive current of the motor 10 decreases once.

After that, when the time t34 comes, the monitoring time period ends. In a case that the state continues that a rise of a position signal is not detected until the timing when the monitoring time period ends, that is, until the timing when the expectation time period ends, the control unit 3 serves as the stopping means performing control of stopping the drive of the motor 10. This turns off the energization to the motor 10 to cause the drive current to become zero.

Note that such a forcible switching of the energization pattern is not performed in a time period other than the monitoring time period. As described below, in the present embodiment, the control unit 3 uses the energization switching counter to control whether to perform such an operation in the monitoring time period.

Figure 4:
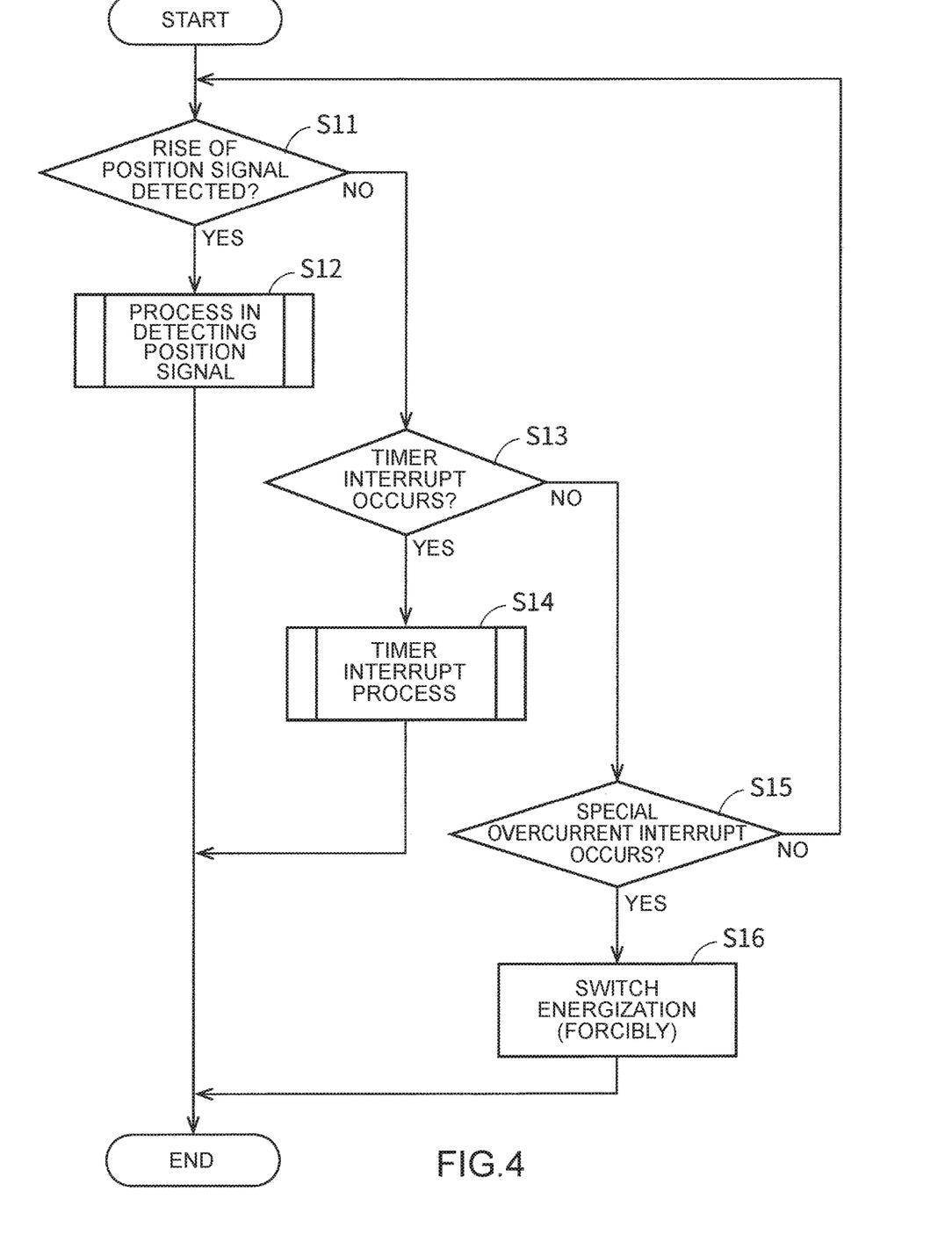
FIG. 4 is a flowchart illustrating operations of a control unit in the present embodiment.

FIG. 4 is a flowchart illustrating the operations of the control unit 3 in the present embodiment.

A process illustrated in FIG. 4 is repeatedly performed while the motor 10 is being driven. Specifically, in step S11, the energization switching timing monitor unit 31 determines whether or not a rise of a position signal is detected. When a rise of a position signal is detected (YES), the process goes to step S12, and when not (NO), the process goes to step S13.

In step S12, the control unit 3 performs a process in detecting a position signal as described later.

In step S13, the energization switching timing monitor unit 31 determines whether or not a timer interrupt occurs. When a timer interrupt occurs (YES), the process goes to step S14, when not (NO), the process goes to step S15.

In step S14, the control unit 3 performs a timer interrupt process as described later.

In step S15, the energization switching timing monitor unit 31 determines whether or not a special overcurrent interrupt occurs. When the overcurrent monitor unit 32 determines that the drive current is larger than the special overcurrent threshold during a monitoring time period, and a signal is output from the overcurrent monitor unit 32 to the energization switching timing monitor unit 31, the energization switching timing monitor unit 31 determines that the special overcurrent interrupt occurs. When the special overcurrent exists (YES), the process goes to step S16, and when not (NO), the process returns to step S11.

In step S16, the energization switching timing monitor unit 31 outputs the energization switching timing information for forcibly switching the energization pattern. This allows the energization pattern to be forcibly switched.

When any of the processes in step S12, step S14 and step S16 ends, a cycle of processes ends.

Figure 5:
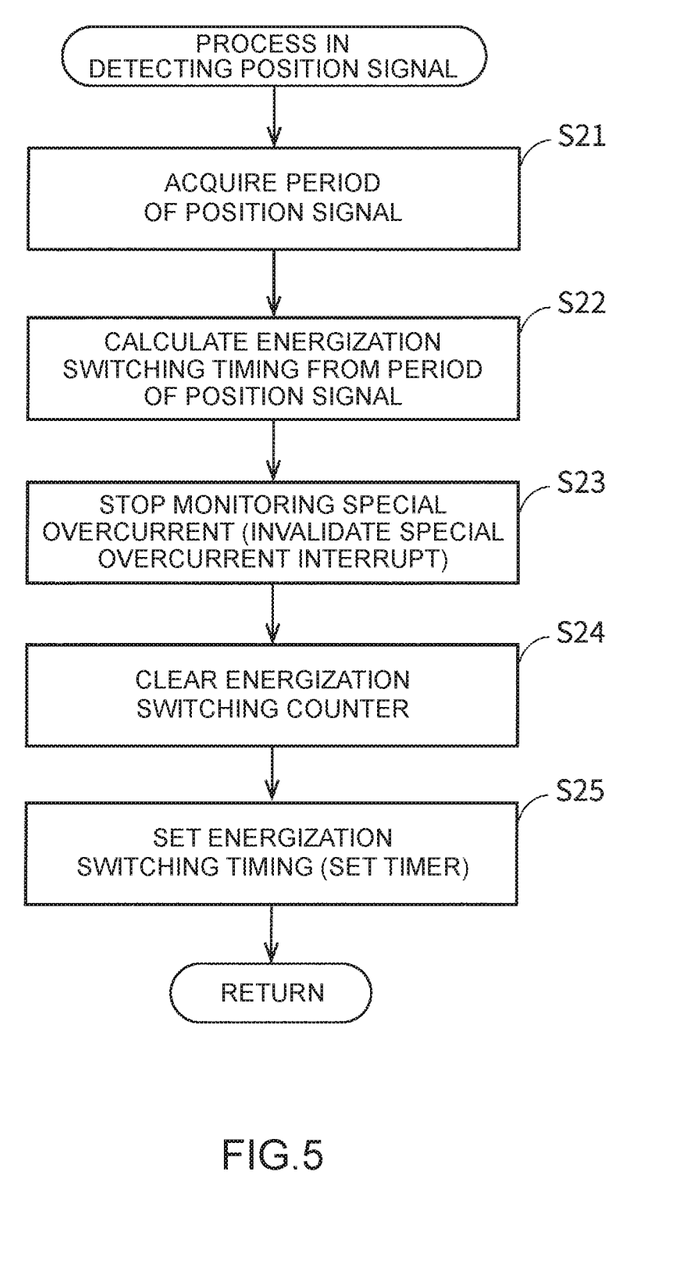
FIG. 5 is a flowchart illustrating a process in detecting a position signal.

FIG. 5 is a flowchart illustrating the process in detecting a position signal.

In step S21, the energization switching timing monitor unit 31 acquires a period of the position signal. For example, the energization switching timing monitor unit 31 acquires a latest period from the previous rise timing to the rise timing currently detected.

In step S22, the energization switching timing monitor unit 31 calculates an energization switching timing from the period of the position signal.

In step S23, the energization switching timing monitor unit 31 stops monitoring the special overcurrent. Specifically, the energization switching timing monitor unit 31 invalidates the special overcurrent interrupt.

In step S24, the energization switching timing monitor unit 31 clears the energization switching counter.

In step S25, the energization switching timing monitor unit 31 sets the energization switching timing. Specifically, based on the period of the position signal, the energization switching timing monitor unit 31 sets the next energization switching timing to a timing ahead by 30 degrees in an electrical angle, and sets the timer such that a timer interrupt occurs at that timing. When step S25 ends, the process returns to the process in FIG. 4.

Figure 6:
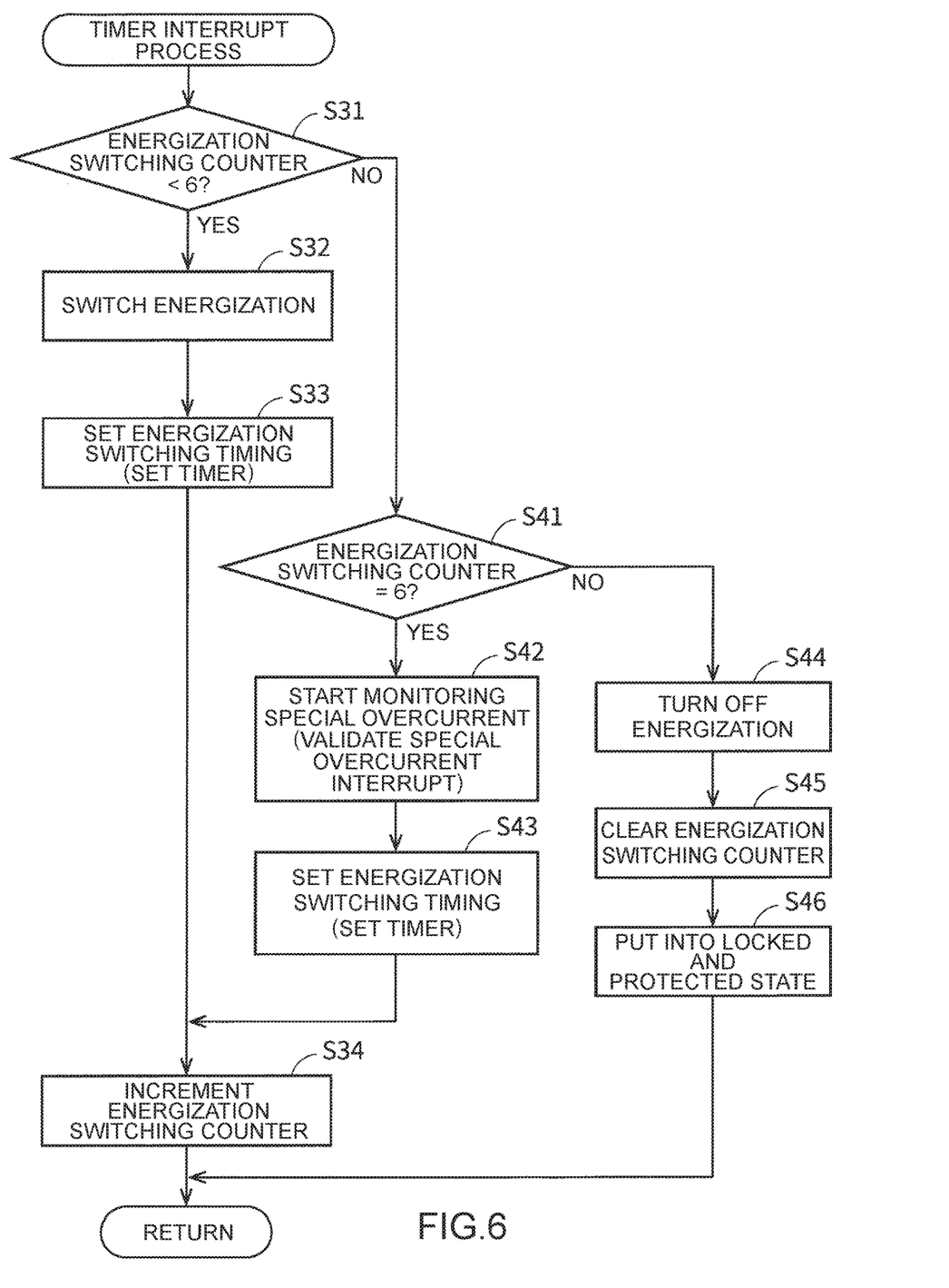
FIG. 6 is a flowchart illustrating a timer interrupt process.

FIG. 6 is a flowchart illustrating the timer interrupt process.

As illustrated in FIG. 6, in step S31, the energization switching timing monitor unit 31 determines whether or not a value of the energization switching counter is smaller than six. When the value of the energization switching counter is smaller than six (YES), the process goes to step S32, and when not (NO), the process goes to step S41.

In step S32, the energization switching timing monitor unit 31 outputs the energization switching timing information. This allows the energization pattern to be switched to the next energization pattern.

In step S33, the energization switching timing monitor unit 31 sets the energization switching timing based on the period of the position signal. Specifically, the energization switching timing monitor unit 31 sets the energization switching timing to a timing ahead by 60 degrees in an electrical angle, and sets the timer such that a timer interrupt occurs at that timing.

In step S34, the energization switching timing monitor unit 31 increments the energization switching counter. Specifically, in step S34, the value of the energization switching counter increases by one. When step S34 ends, the process returns to the process in FIG. 4.

On the other hand, in step S41, the energization switching timing monitor unit 31 determines whether or not the value of the energization switching counter is equal to six. When the value of the energization switching counter is equal to six (YES), the process goes to step S42, and when not (NO), the process goes to step S44.

It is at the time t32 illustrated in FIG. 3 when, in step S41, the value of the energization switching counter is determined to be equal to six. Specifically, in this case, in step S42, the energization switching timing monitor unit 31 starts monitoring the special overcurrent. Specifically, the energization switching timing monitor unit 31 validates the special overcurrent interrupt. The energization switching timing monitor unit 31 also outputs the signal to the overcurrent monitor unit 32 to cause the overcurrent monitor unit 32 to start determining whether or not the drive current of the motor 10 is larger than the special overcurrent threshold.

In step S43, the energization switching timing monitor unit 31 sets the energization switching timing based on the period of the position signal. Specifically, the energization switching timing monitor unit 31 sets the timer such that a timer interrupt occurs at a timing ahead by 60 degrees in an electrical angle. If step S43 ends, the process in step S34 is performed, and then, the energization switching counter is incremented. By doing so, the value of the energization switching counter becomes seven. After that, the process returns to the process in FIG. 4.

On the other hand, it is at the time t34 illustrated in FIG. 3 when, in step S41, the value of the energization switching counter is not determined to be equal to six. The time t34 that is past the time t32 is when a timer interrupt occurs thereafter. Specifically, in this case, in step S44, the control unit 3 turns off the energization of the motor 10 to stop the drive of the motor 10.

In step S45, the energization switching timing monitor unit 31 clears the energization switching counter.

In step S46, the control unit 3 puts the motor 10 into a locked and protected state. Note that the control unit 3 may not put the motor 10 into a locked and protected state. When step S46 ends, the process returns to the process in FIG. 4.

Figure 7:
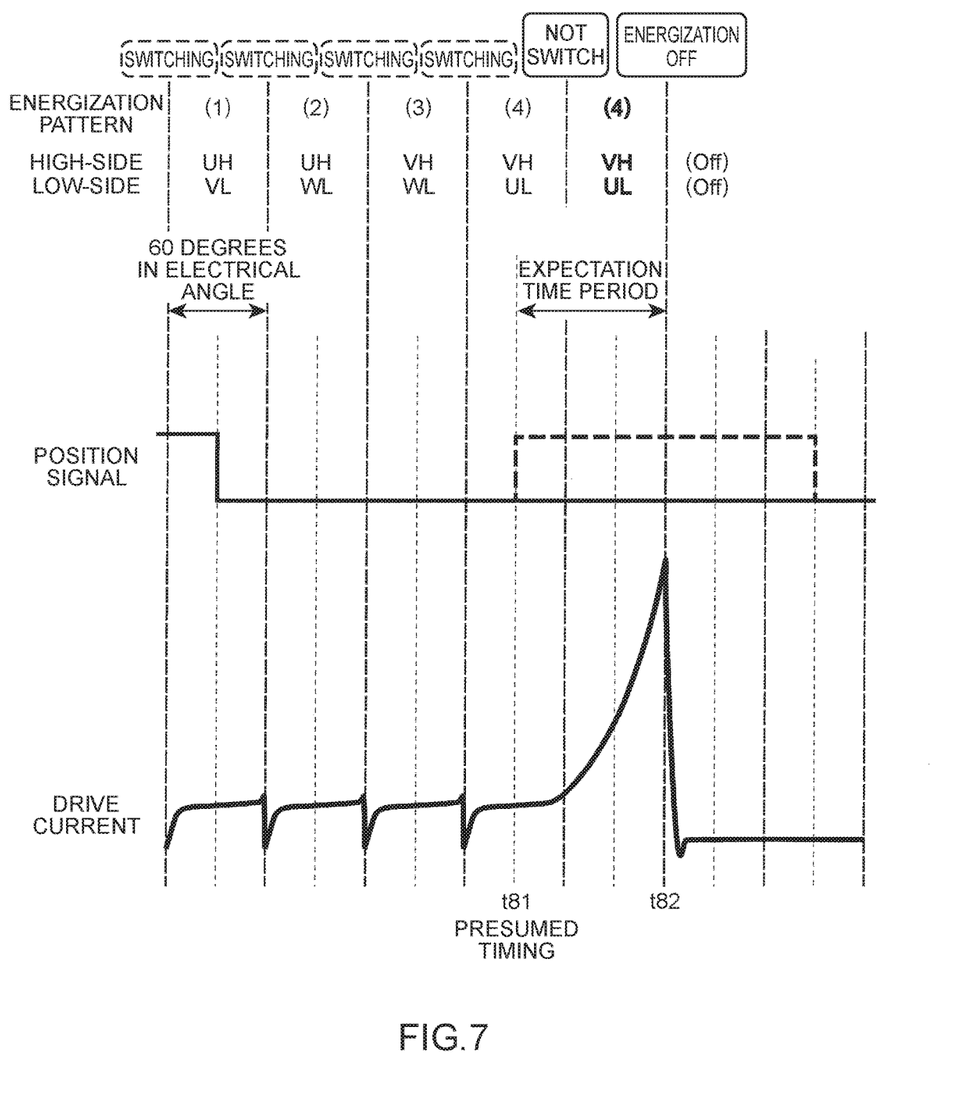
FIG. 7 is a view illustrating a relationship between energization patterns and a position signal when a forcible switching operation on the energization pattern is not performed.

FIG. 7 is a view illustrating a relationship between the energization patterns and the position signal when the forcible switching operation on the energization pattern is not performed.

FIG. 7 illustrates an example of an operation when the forcible switching operation on the energization pattern is not performed. In a case where a presumed timing is presumed to come at a time t81, if a rise timing of a position signal is not detected, the energization pattern remains not being switched. For example, in a case that a rise timing of a position signal is not detected during a time period from a timing of switching from the third energization pattern to the fourth energization pattern until a time t82 after a time equivalent to an electrical angle of 120 degrees elapses, even if the energization of the motor 10 is configured to be turned off, the drive current may rapidly increase as the energization is prolonged in the fourth energization pattern. When such an excessive drive current flows, a failure possibly occurs in the motor 10 or circuit components in the motor driving control device 1.

In contrast, in the present embodiment, as illustrated in FIG. 3, in the state of not detecting a rise of a position signal, when the value of the drive current becomes the special overcurrent threshold or more (at the time t33) during the monitoring time period from the time t32 to the time t34 after the presumed rise timing t31 of the position signal, the forcible switching operation is performed to forcibly switch to the next energization pattern, regardless of the timing of switching of the normal energization pattern (the timing of switching based on the timer interrupt) which is set based on the rise timing of the position signal. By switching the energization pattern, the magnitude of the drive current of the motor 10 decreases once. Therefore, even in a case that a rise of a position signal is not detected for some reasons, and finally, the motor 10 stops, the magnitude of the drive current of the motor 10 is able not to exceed the special overcurrent threshold, and the motor 10 or the motor driving control device 1 can be protected.

The forcible switching of the energization pattern is performed only when the value of the drive current is the special overcurrent threshold or more during the monitoring time period. Accordingly, the forcible switching of the energization pattern can be prevented from being performed unless otherwise intended. During a time period other than the monitoring time period, overcurrent control can be performed based on the normal overcurrent threshold.

The monitoring time period is set after the presumed timing. Since the monitoring time period starts at a timing at an interval from the presumed timing, in a case that a timing detecting a rise of a position signal is slightly delayed due to some factors, the forcible switching of the energization pattern can be prevented from being performed despite an occurrence of the rise of the position signal.

[Others]

The motor driving control device is not limited to the circuit configurations described in the above embodiment. Various circuit configurations configured to adapt to the aspects of the present disclosure can be used. For example, features of the above embodiment may be partially combined to form the motor driving control device. In the above embodiment, some components may not be provided, or some components may be formed of another aspect.

In the above embodiment, the timing when the monitoring time period starts or ends may be adequately modified. The timing when the monitoring time period starts may be appropriately set in consideration of a presumed delay time of a rise of a position signal (30 degrees in an electrical angle is assumed in the present embodiment). If the timing when the monitoring time period starts is too early, the special overcurrent interrupt may occur without waiting for detection of a rise of a position signal delayed due to some factors, and thereby, a failure may occur that switching to the next cycle is made earlier than the normal timing.

In the case that a rise of a position signal is not detected, the forcible switching of the energization pattern may be performed several times or more.

Note that the process performed after the forcible switching of the energization pattern is performed is not specifically limited. For example, in a case that a rise of a position signal is detected after the forcible switching operation is performed, switching to the next cycle may be made based on that detection timing. Alternatively, in the case that a rise of a position signal is detected after the forcible switching operation is performed, the motor may be forcibly stopped.

In the present embodiment, the expectation time period is the time period from the presumed timing to the time when the monitoring time period ends, but the expectation time period is not limited to that time period. The expectation time period may be appropriately set in consideration of the assumed delay time of a rise of a position signal, or the assumed occurrence condition of the motor current, and the like. Specifically, the shorter the expectation time period is, the more the motor is likely to stop, and the longer the expectation time period is, the more the power supply current is likely to increase.

The special overcurrent threshold may be the same as or different from the normal overcurrent threshold.

The motor driven by the motor driving control device according to the present embodiment is not limited to the brushless motor, but may be another type of motor.

The number of phases of the motor is not limited to three. Specifically, the number of energization patterns is not limited to those described above. Among conceivable energization patterns (a combination of energized phases), only some energization patterns may be configured to be switched in a predetermined order to drive the motor. In this case, if a rise of a position signal is not detected every time the energization patterns are entirely switched in a predetermined order (every time one cycle of switching control is performed), the operation described above may be performed.

The input command rotational frequency input to the control unit may be that generated within the motor driving control device.

A rotor position detection method and a rotational frequency detection method are not specifically concerned. A detector different from the Hall element may be used to obtain a position detection signal of the motor. For example, a Hall IC and the like may be used. The number of Hall elements provided to the motor is not limited to three. One Hall element may be used to perform driving by a so-called one-sensor scheme.

The above flowcharts and the like illustrate an example for describing the operation, and are not limited to this. The steps illustrated in the respective flowcharts are specific examples, and are not limited to those flowcharts. For example, an order of the steps may be modified, another process may be inserted between the steps, and the processes may be in parallel.

All or a part of the processes in the above embodiment may be performed by means of a software, or may be performed by means of a hardware circuit. For example, the control unit is not limited to a microcomputer. At least a part of the configuration within the control unit may be processed by means of a software.

The above embodiment is to be construed as exemplification in all matters and not limiting. The scope of the present disclosure is not shown in the above description but in the Claims, and intended to include all modifications in the meaning and scope equivalent to the Claims.

What is claimed is:

1. A motor driving control device comprising:
   a motor driving unit having a plurality of switching elements connected to a power supply and configured to selectively energize coils with a plurality of phases of a motor;
   a position detector corresponding to any one of the plurality of phases and configured to output a position signal, a phase of the position signal changing depending on a position of a rotor of the motor;
   a current detector configured to detect a drive current of the motor; and
   a control unit configured to output a drive control signal for operating the plurality of switching elements to the motor driving unit, wherein
   the control unit includes
   a change detecting means configured to detect a predetermined phase change in the position signal,
   a first switching means configured to sequentially switch energization patterns of the coils with the plurality of phases based on a timing when the phase change is detected, and
   a second switching means configured to, in a state where the change detecting means does not detect the phase change, when a value of the drive current becomes a predetermined first threshold or more during a monitoring time period after a timing when the predetermined phase change in the position signal is expected, perform an operation to forcibly switch to a next energization pattern regardless of the timing of switching the energization pattern by the first switching means.

2. The motor driving control device according to claim 1, wherein
   the control unit further includes a stopping means configured to stop driving of the motor in a case that the state where the change detecting means does not detect the phase change continues until a timing when the monitoring time period ends.

3. The motor driving control device according to claim 1, wherein
   the motor includes three-phase coils, and
   a time from the timing when the predetermined phase change in the position signal is expected to the timing when the monitoring time period ends is longer than a time presumed to be taken for the rotor to rotate by 30 degrees in an electrical angle.

4. The motor driving control device according to claim 1, wherein
   a timing when the monitoring time period starts is a timing when a predetermined time elapses from the timing when the predetermined phase change in the position signal is expected.

5. The motor driving control device according to claim 1, wherein
   the control unit further includes an overcurrent restricting means configured to stop the energization by the motor driving unit when the value of the drive current exceeds a predetermined second threshold.

6. The motor driving control device according to claim 1, wherein
   the second switching means does not perform the operation to forcibly switch to the next energization pattern during a time period other than the monitoring time period.

7. A motor driving control method for driving a motor by use of
   a motor driving unit having a plurality of switching elements connected to a power supply and configured to selectively energize coils with a plurality of phases of the motor,
   a position detector corresponding to any one of the plurality of phases and configured to output a position signal, a phase of the position signal changing depending on a position of a rotor of the motor, and
   a current detector configured to detect a drive current of the motor,
   the method comprising:
   a change detecting step of detecting a predetermined phase change in the position signal;
   a first switching step of sequentially switching energization patterns of the coils with the plurality of phases based on a timing when the phase change is detected; and a second switching step of, in a state where the change detecting step does not detect the phase change, when a value of the drive current becomes a predetermined first threshold or more during a monitoring time period after a timing when the predetermined phase change in the position signal is expected, forcibly performing an operation to switch to a next energization pattern regardless of the timing of switching the energization pattern by the first switching step.

* * * * *